United States Patent [19]
Ready

[11] 3,840,862
[45] Oct. 8, 1974

[54] STATUS INDICATOR APPARATUS FOR TAG DIRECTORY IN ASSOCIATIVE STORES

[75] Inventor: Dudley T. Ready, Glendale, Ariz.

[73] Assignee: Honeywell Information Systems Inc., Waltham, Mass.

[22] Filed: Sept. 27, 1973

[21] Appl. No.: 401,467

[52] U.S. Cl. .............................................. 340/172.5
[51] Int. Cl. .............................................. G06f 13/00
[58] Field of Search .................................. 340/172.5

[56] References Cited

UNITED STATES PATENTS

| | | | |
|---|---|---|---|
| 3,593,315 | 7/1971 | Patel | 340/172.5 |
| 3,670,310 | 6/1972 | Bharwani et al. | 340/172.5 |
| 3,685,020 | 8/1972 | Meade | 340/172.5 |
| 3,699,532 | 10/1972 | Schaffer | 340/172.5 |
| 3,735,360 | 5/1973 | Anderson et al. | 340/172.5 |

*Primary Examiner*—Gareth D. Shaw
*Assistant Examiner*—Michael Sachs
*Attorney, Agent, or Firm*—Lloyd B. Guernsey; Edward W. Hughes

[57] ABSTRACT

A four level directory is used to retain "tags" identifying the address of data information stored in a cache store. A three bit storage unit stores a full/empty status indication of each level of the tag directory and an indication of the level or tag of the area to be loaded next in the cache store. The storage unit indicates the storage of valid data in cache store locations thus, clearing the three bit storage unit, effectively clears the cache store by indicating an invalid storage of data information.

8 Claims, 7 Drawing Figures

| MC1 | MC2 | MC3 | POINTER | LEVEL FULL OR EMPTY |
|---|---|---|---|---|
| 0 | 0 | 0 | A | E |
| 1 | 0 | 0 | B | E |
| 0 | 1 | 0 | C | E |
| 1 | 1 | 0 | D | E |
| 0 | 0 | 1 | A | F |
| 1 | 0 | 1 | B | F |
| 0 | 1 | 1 | C | F |
| 1 | 1 | 1 | D | F |
FIG. 5
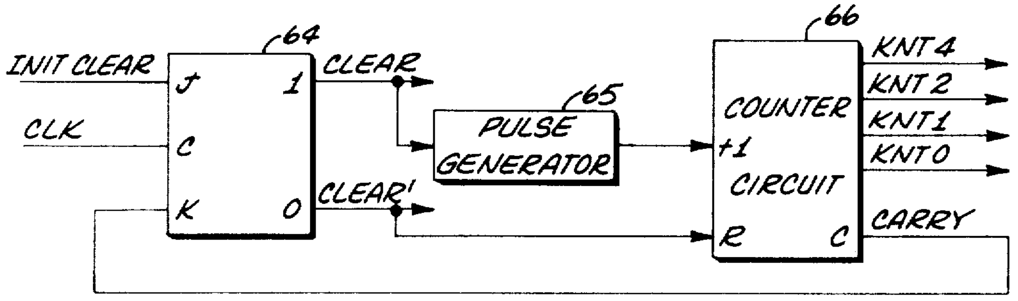
FIG. 6
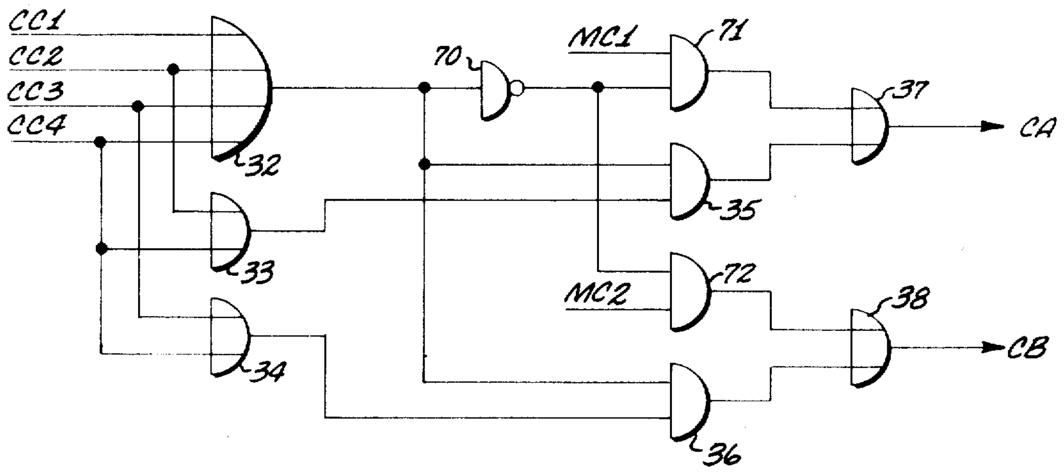
FIG. 7

STATUS INDICATOR APPARATUS FOR TAG DIRECTORY IN ASSOCIATIVE STORES

BACKGROUND OF THE INVENTION

This invention relates to an improvement in memories for use in an electronic binary computer system. It is directed to reducing the complexity of the associative addressing function in a cache memory store or its equivalent.

FIELD OF THE INVENTION

With large computer systems. having memories on the order of a million words or greater, it becomes very expensive to increase system performance by reducing the memory access time. An alternative to decreasing data access time to instructions and operands is to use a high speed cache memory which is interposed between the main memory and the central processor. In order to obtain practical results, it is necessary that the cache memory be subdivided into sections, each of which is loaded with a block of data from the main memory.

When data is to be fetched from main memory in accordance with an absolute address supplied by the central processor, it is necessary to make an association between the absolute address and the actual address internal to the cache memory subsystem. Basically, a specialized paging function must be performed. A directory is maintained in which there is a group of binary digits called a "tag" for each block of data that has been loaded from main store into the cache store whereby the desired association can be made. For the directory function, the absolute address itself is data. Perhaps ideally, the directory function could be implemented with an associative or content addressable memory. However, it is not practical to provide the implicit comparator structure for each and every tag.

The cache blocks are normally organized into sets, typically four, and a portion of the absolute address is used to select a block within each set. This portion of the absolute address is treated as a block number and is used to fetch tags, one tag from each set, which are then compared with the appropriate portion of the absolute address that is being fetched. For the purposes herein, a cache memory of this type is called a set associative memory. Such a memory requires two additional principal mechanisms. A replacement procedure must be implemented so that when the four blocks of cache store associated with a given block number are filled from main memory, a desired block will be replaced if the central processor issues a fetch to that block number. A full/empty flag mechanism must also be implemented, especially when the cache memory is initialized to a cleared condition. Further, an indicator is needed which represents whether or not a particular block has been loaded from main memory with currently valid data.

DESCRIPTION OF THE PRIOR ART

In prior art cache memories using a round robin type of replacement procedure, a counter was used to indicate the location for the next data information. One count of the counter was required for each block of data information. Using the present embodiment cache store comprising four-word blocks organized into 64 columns for each 1012 words of data information, 64 two-bit counters would be required for each 1K of cache store. The state of the counters was then used to indicate which level or tag was to be loaded next.

A separate mechanism was then used in prior art systems for implementing the full/empty flag indicator to denote the status of that word. Single bit memory cells were used to store the full/empty flag indicator and thus each block of four words or 256 blocks required 256 memory cells. Furthermore, the indication of valid data in the cache store required further logic since random data might be resident in the cache store on an initialize cycle for instance.

It is a primary object of the invention to reduce this logic requirement.

SUMMARY OF THE INVENTION

The cache store apparatus of the present invention comprises a cache store, a tag directory for storing the addresses of the data information stored in the cache store, comparators for determining whether the data information requested is in the cache store, and control circuitry including a storage unit with associated logic controls for indicating the status of the cache store by storing the status of the address locations stored in the tag directory.

The storage unit stores an indication or flag of whether the cache store contains data information, i.e., a full or empty status, and an indication of which level of the tag directory is to receive the next block of address information. The indicator apparatus of which the memory cell storage unit is a part includes logic for decoding the level indicator to signify the next level in which information from the main memory store is to be stored for possible repeat usage. The decode logic indicates the entry of valid date into the storage unit and controls the entry of the address information to the tag directory and thereby controls the placement of the addressed data information in the cache store. Thus the present invention uses $n+1$ bits of information to supply the replacement procedure for each $2^n$ levels in one column of the tag directory. In the present embodiment, $n=2$ since four levels are in one column of the tag directory and thus a three bit memory cell storage unit is used. This is in replacement for one bit for each block and a $2^n$ counter for each level. A clearing operation for the cache store is performed by resetting the storage unit indicator.

It is, therefore, an object of the present invention to provide an enhanced indicating apparatus for determining the status of a cache store associative memory.

It is a more particular object of the present invention to provide an indicator apparatus for a cache store associative memory which indicates the storage of valid data in the cache store and indicates the positions in the cache store already containing valid data information.

It is another object to provide an indicator mechanism for a tag directory of a cache store which comprises storage cells implemented by control logic to store the replacement procedure indicator, to store the full/empty indicator, and to store a valid data indication.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be more fully understood from the following description of an illustrated embodiment when read in conjunction with the accompanying drawing, wherein:

FIG. 5 is a table showing the consecutive steps taken by the indicator apparatus of FIG. 4;

FIG. 6 is a logic diagram of a cache store clearing circuit controlling the indicator apparatus of FIG. 4; and FIG. 7 is a logic diagram of the generation of a portion of the cache store address signals.

DESCRIPTION OF THE PREFERRED EMBODIMENT

Referring to the figures, a cache store 10 is a "look-aside memory" or high speed buffer storage preferably located in the Central Processor of a data processing system. The cache store provides a fast access to blocks of ldata previously retrieved from the main memory store and possibly updated later. The effective access time in the cache store is obtained by operating the cache store in parallel to existing processor functions. Successful usage of the cache store requires that a high ratio of storage fetches for data information be made from the cache store rather than requiring that the processor address the main memory store directly. In any event, the search of the cache store for the possible quick retrieval of the data information should not delay the retrieval from the main memory store. The system according to the preferred embodiment checks the cache store while the generation of a potential retrieval from main memory store is being processed. If the data information is found in the cache store, the retrieval is blocked. The processor obtains the data information from the cache store in a much shorter period of time without the processor being aware of the source.

Figure 1:
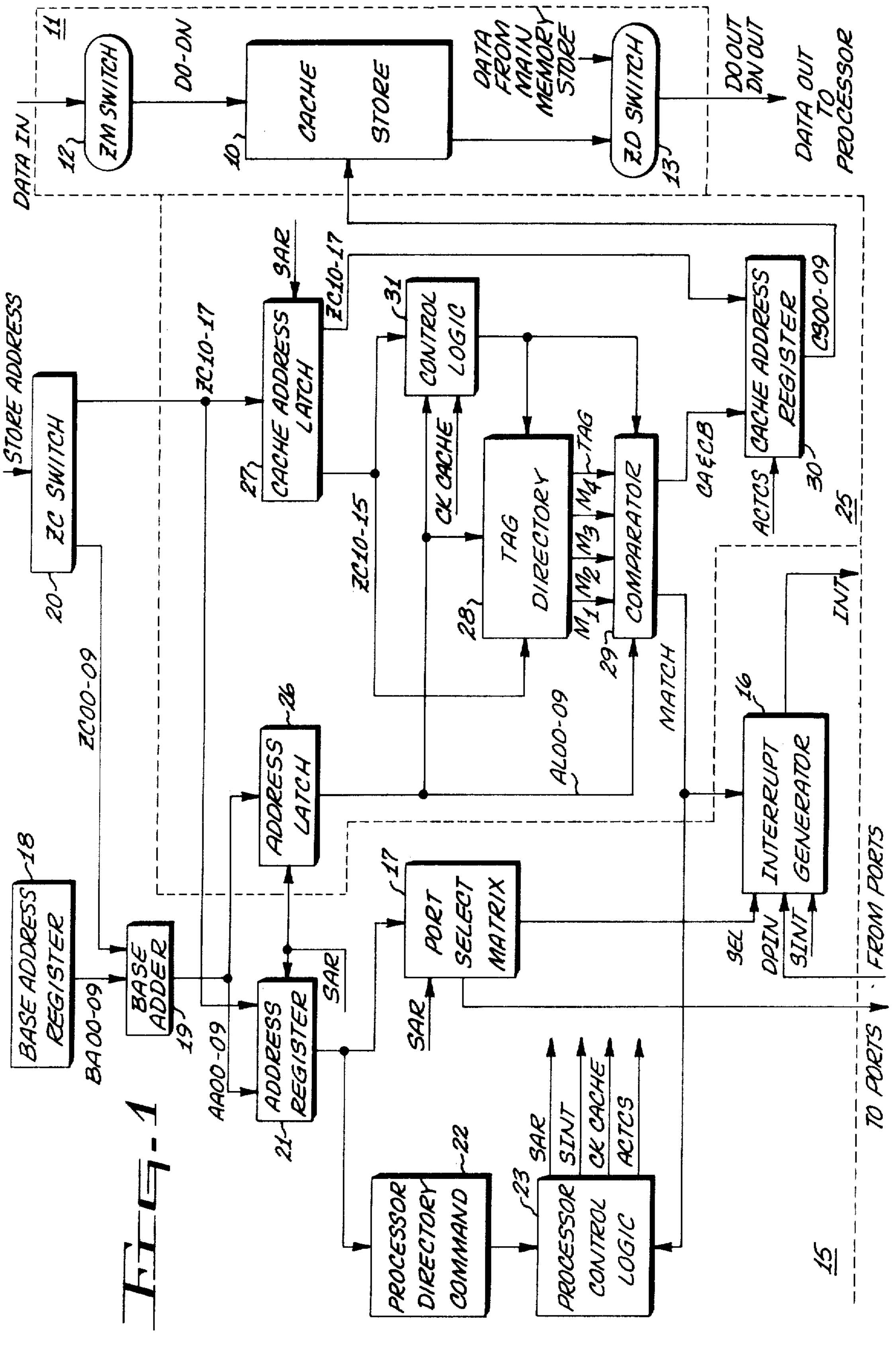
FIG. 1 is a block diagram of a precessor communications control apparatus including a cache store and associated control.

The communication control system of FIG. 1 can be divided into three main areas. The first area is a cache store section 11 which includes the cache store 10, an input memory bus, a ZM switch 12, and a read allow circuit or output memory bus, a ZD switch 13. The second area or section is a standard data processor control section 15 which includes an interrupt generator circuit 16, a port select matrix circuit 17, a base address register 18, a base adder 19, a ZC switch 20 for controlling the store address input, an address register 21, and a processor directory command 22 and a processor control logic 23 blocks representing the control logic of the processor. The third area is a cache directory section 25 which includes an address latch register 26, a cache address latch register 27, a tag directory 28, a comparator 29, a cache address register 30, and associated counters and control logic shown as block 31.

During main memory store fetch cycles, the data information is distributed from the input memory bus for usage by the processor while at the same time the ZM switch 12 is enabled to allow storage into the cache store 10. On subsequent processor cycles, the cache store 10 is checked at the same time that a fetch from the main memory store (not shown) is being readied. If the data needed is already in the cache store, the fetch from the main memory store is aborted by controlling the communications control section. A cache read cycle is enabled by the processor directory command section 22, the ZM switch 12 is disabled and the ZD switch 13 is enabled to transfer the data information from the cache store 10 directly to the processor.

Figure 3:
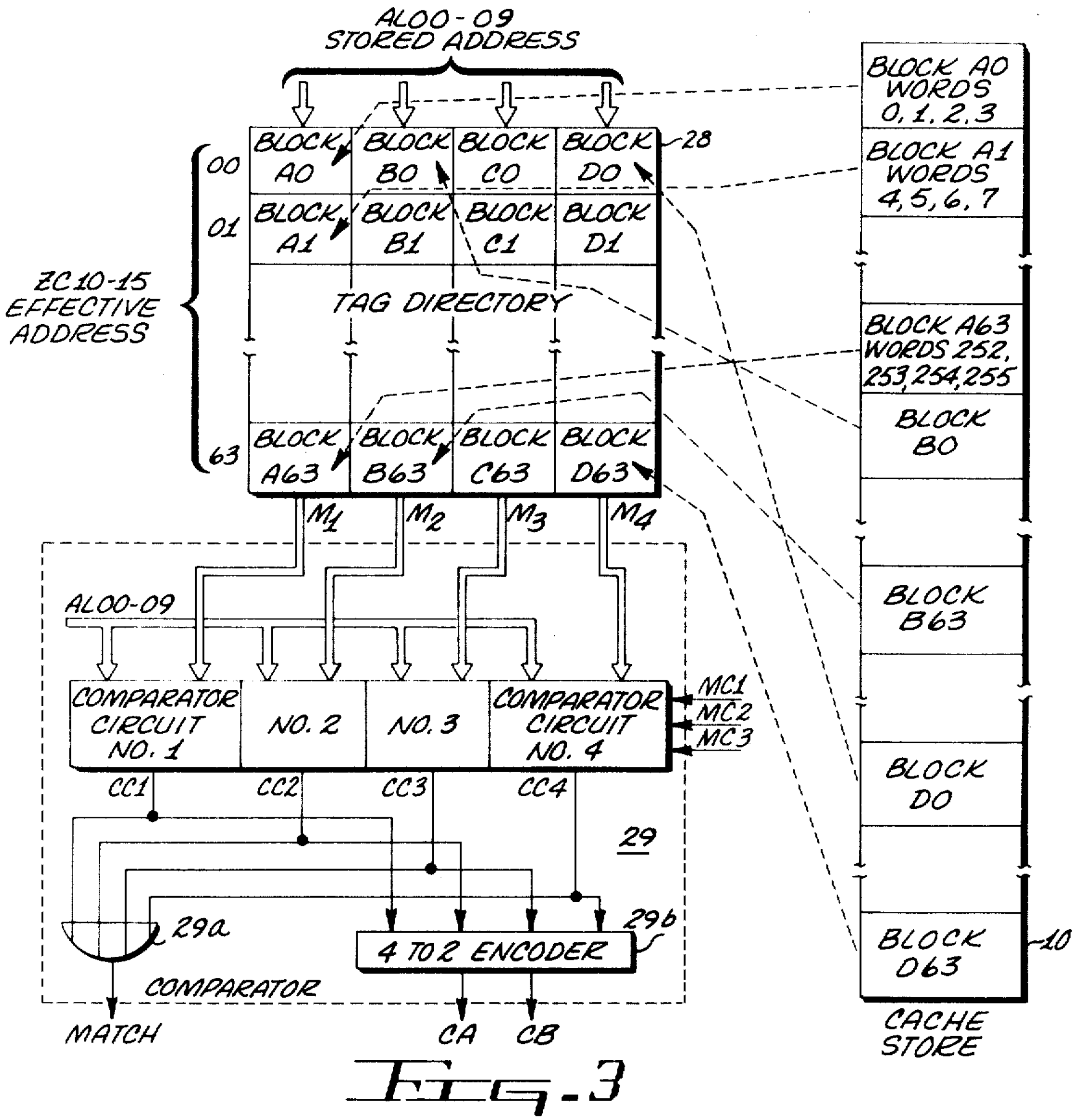
FIG. 3 is a block diagram of a tag directory with a comparator and shows the mapping strategy between the cache store and the tag directory shown in FIG. 1.

The cache or tag directory 28 identifies the storage section or block in the cache store 10. "TAG" words are stored in the tag directory 28 to reflect the absolute address of each date block. The mapping of the tag directory 28 according to the preferred embodiment is called a four level set associative mapping. The mapping organization is shown in FIG. 3. The tag directory is divided into N columns, 64 for example, to correspond to the number of blocks in the cache store. Each column has four levels. The cache store is divided into N number of sections of 64 four-word blocks (256 words). Each block maps directly into a corresponding column of the directory. Each column of the tag directory then can contain addresses of four blocks, each from a different section. The replacement procedure for loading new blocks into a column which is full is on a first in, first out basis and is called round robin organization (RRO).

The tag directory 28 is implemented as a small memory with the number of locations equal to the number of blocks in the cache store. The low order address bits ZC10–15 of the effective address are used to access one column of the tag directory 28, see FIGS. 1 and 2. Each tag word includes the high order address signals AL00–09 of the absolute address.

Referring again to FIG. 1, during the time that tag directory access is being accomplished, the addition of base address bits BA00–09 from the base address register 18 to the high order effective address bits ZC00–09 from the ZC switch 20 is taking place in the base adder 19. The absolute address bits AA00–09 from the base address adder 19 are stored in the address register 21 and the address latch register 26 and will be available for a comparison in the comparator 29 at the same time tag words M1–M4 are available from the tag directory 28. The comparator 29 will generate a MATCH signal between the time the strobe address register signal SAR is generated and the time that an interrupt signal INT is to be generated by the interrupt generate 16. If a comparison is made with a valid address data, the MATCH signal will not allow on INT signal to be generated. The comparison match indicates that a retrieval of data information from the main memory store is not required because the data information is presently available in the cache store 10. The MATCH signal enables the processor control logic 23 to generate an activate cache store ACTCS signal which is directed to the cache address register 30. The cache address register 30 addresses the location in the cache store 10 determined by the address bits ZC10–17 and the address signals CA and CB generated by the comparator 29 as a result of the comparison of the absolute address signals and the tag signals. The ZD switch 13 is activated to allow the data information from the addressed storage location in the cache store 10 to be directed to the processor. If a noncomparison is indicated by the comparator 29, no MATCH signal is generated and the interrupt generator 16 generates an INT signal which will be transmitted to the system controller via the selected port to accomplish the transfer of data information from the main memory store according to the address signals applied to the ZC switch 20. The data information from the main memory store is then retrieved and directed simultaneously to the processor and to the cache store 10. If the cache store 10 is already full, according to the first-in-first-out organization, the first data block placed into cache store and not subsequently used, is displaced by the new information.

Figure 2:
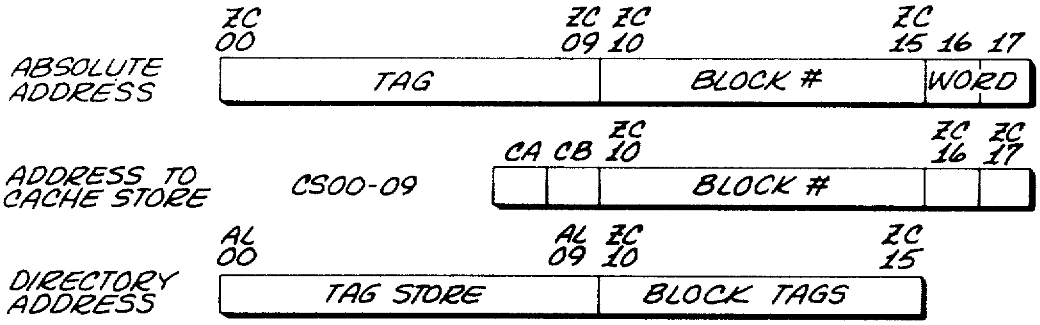
FIG. 2 is a diagram illustrating the addressing scheme used by the FIG. 1 cache memory store.

The cache storage address signals CS00–10, see FIGS. 1 and 2, are developed from the comparator logic and the effective address. The 10 bit address provides access to a 1,024 word cache storage. The 10 bit address uses address signals CA and CB from the comparator 29, developed from the comparison bits CC1–4 from the tag directory 28, see FIG. 4, and bits ZC10–17 from the effective address. The address signals CA and CB are used to address the required level or chips select from one of the four words in the block of words in the cache store 10.

Referring now to FIG. 7, the four to two encoder 29*b* of the comparator 29 comprises OR-gates 32, 33 and 34 encoding the comparison bit signals CC1–4 together with AND-gates 35 and 36. OR-gates 37 and 38 generate the address signals CA and CB either from the comparison bit signals CC1–4 on a read cache store operation or from the status signals MC1 and MC2 on a write cache store operation. An inverter 70 disables AND-gates 71 and 72 if any one of the comparison signals CC1–4 is enabled on a correct comparison. If no comparison signals are enabled, the AND-gates 71 and 72 each have one leg enabled in preparation of a write cache store operation. As will be discussed later in FIG. 4, the MC1 and MC2 signals designate the levels of the columns that are to accept the next data information address.

The cache store 10 of the preferred embodiment stores 1,024 data bits D0–DN in each chip section with each word length having 36 bits of information in each half of memory store, 72 bits of information in the combined sections. The cache store 10 has four levels accessed by the CA and CB address signals from the comparator 29. The readout data information signals D0OUT–DNOUT are common to all four levels.

The cache store 10 is addressed by the address signals ZC10–17. The ZC16 and ZC17 signals signify whether the word addressed is in the upper or lower half of the memory block or whether a double word, both halves, is to be accessed at the same time.

The D0–DN data signals are the DATA IN signals, see FIG. 1, entered by the ZM switch 12, and the D0OUT–DNOUT signals are the DATA OUT signals transmitted to the main registers of the processor by the ZD switch 13.

The tag directory section 25 includes logic circuitry to indicate that a block of words in the cache store 10 is full and that the data is valid. The logic circuitry develops full/empty status bit signals. The status bit signals are associated with each tag word. The cache store 10 can be cleared by resetting all status bit signals. The cache store 10 is cleared whenever the central processing unit answers an external interrupt signalling that a new program is to be initiated. The status bit signals are activated when a block loading of data information is enabled.

Each of the 64 columns of the tag directory 28 has a RRO circuit indicating the level or tag that is to be loaded next. The RRO circuit is included with the full/empty status bit signal storage in the control logic 31. The RRO circuit is advanced when a new block of data information is placed into the cache store 10. The absolute address bits AL00–09 are stored into the tag directory location accessed by the effective address bits ZC10–15 and the RRO circuit is advanced accordingly. The use of a three bit store unit as a combined full/empty status bit and RRO circuit form the heart of the present invention and will be described in more detail later.

The data information stored in the tag directory 28 is the main memory address of the data stored in the cache store 10. Only ten address bits are shown stored in the tag directory 28, the AL00–09 address bits from the address latch register 26. Thus by addressing the level of the tag directory 28, see FIG. 3, by the effective address ZC10–15 signals, the block word information stored in the cache store 10 is obtained. The address information stored in the addressed level is compared in the comparator 29 to the main memory store address AL00–09 signals being requested by the processor.

The comparator 29 essentially is a plurality of comparing circuits, 10 in the present embodiment, which compares the ten address signals from each level of the tag directory 28, the M1, M2, M3 and M4 signals, to the 10 address signals Al00–09. If a comparison is made by all the signals in any 10 signal comparator circuit No. 1, 2, 3 or 4 and provided the level contained valid data, the comparator 29 generates a MATCH signal form an OR-gate 29*a* to inhibit interrupt generator 16 from generating the INT signal. The retrieval of data information will then be from the cache store 10 rather than from the main memory store.

The cache control or directory section 25 is an extension of the port control functions of the processor. The controls of the cache store operate in synchronism with the port control. The interrupt generator 16 controls the tag directory 28 and the search of the tag directory 28 via the processor control logic 23. The cache store 10 is under the control of the directory command 22 of the processor. The directory command 22 along with the port select matrix 17 generates the instruction or patterns of signals required to control the operation of the processor ports.

The cache address register 30 generates the CS00–10 signals activating the three type of cycles performed by the cache system according to the signals from the processor directory command 22 and the processor control logic 23 and the address signals for the cache store 10. The first cycle is a cache read which is generated when a compare is signaled by the comparator 29 on a data fetch instruction. A data fetch instruction on which no comparison occurs will generate a block load command to load new data into the cache store 10. A store data command of the processor on which a comparison occurs will cause a cache store write cycle along with a port store cycle. The usual processor cycles and fault and interrupt cycles do not affect the cache system and cause the processor directory command 22 to operate in a manner as if the cache store did not exist.

Referring again to FIG. 1, the processor communication cycle starts with the entry of the store and base address signals into the communications control unit. Shortly thereafter the check cache store CK CACHE signal is activated if the processor cache store is to be used on this cycle. All cache cycles start with the generation of a strobe address register SAR signal. At this time the effective address bits ZC10–15 are stable and enable an immediate acess to the tag directory 28. The SAR signal loads the cache address latch register 27, the address latch register 26, and the address register 21 via the ZC switch 20. Additionally, the SAR signal will store and hold or latch the effective address bits ZC10–ZC17 and the output bits AA00–09 from the base adder 19 into the address register 21 and the address latch 26. Both addresses are saved in the event a block load cycle is required.

The time between the SAR signal and the strobe interrupt SINT signal is the normal time for the selection of the port to be used for main memory communication. At this time the comparison of the addresses from the tag directory 28 and the address latch register 26 are made in the comparator 29 and the selection of the communication port is made by the port select matrix 17. On operations when a correct comparison is made, the MATCH SIGNAL is generated by the comparator 29 thereby inhibiting the generation of the INT signal when the selected port signals a ready signal, DPIN signal, and a strobe interrupt signal SINT is generated by the processor control logic 23. The port cycle is cancelled, and the data from the cache store 10 is used. The ACTCS signal loads the cache address register 30. The control signals of the cache store 10 from the comparator 29 and the effective address bits ZC09–ZC17 are now stored in the cache address register 30.

If a cache read cycle is signalled such as on a transfer operand command, the cache address signals CS00–12 are not stored in the cache address register 30 but will start a cache store access immediately. As soon as the internal SINT signal is generated, the processor control logic 23 will generate a signal signifying that the data is located in the processor port, for this instance in the cache store 10. The port cycle is then completed in a normal fashion transmitting the data information to the operations unit for processing.

On a block load of data into the port system, data information fetch request with no compare in the tag directory 28, two port cycles are required. The first SINT signal will be released to the main memory store and the processor directory command 22 will be loaded with the block load function requirement and the address signals of the cache store will be placed into the cache address register 30. The SINT signal is not sent to the control. This prevents further address generation to allow the initiation of a second cycle. A flag is set in the port to generate the second cycle. During the second cycle, the tag directory 28 is activated to a write mode and the tag address latched in the cache address latch 27 will be written into the tag directory 28. The column address in the tag directory 28 is selected by the effective address bits ZC10–15 and the level is selected by the RRO counter signals, the RRO counter is then updated. The SINT signal is transmitted from the selected port and the incoming data is written into the cache store 10 according to the address stored in the cache address register 30.

The bit signals stored in the tag directory 28 are the address bits AL00–09 from the address latch register 26. These address bits are also applied to the comparator 29 and to the control logic 31. On cache store load cycles, the address bits AL00–09 are entered into the tag directory 28 and control the full/empty flag and RRO status of the control logic 31. On subsequent cycles which check the tag directory 28 for the address of data information stored in the cache store 10, the address bits AL00–09 are compared in the comparator 29 with the four TAG signals M1–M4 from the tag directory 28. The TAG signals reflect the absolute address of each data block.

Referring again to FIG. 3, as stated previously, the columns of the tag directory 28 are addressed and located by the effective address signals ZC10–15. Each column has four levels in which the stored address signals AL00–09 are stored pointing to a particular block in the cache store 10. In order to locate the particular level of the tag directory and the particular location of the data information in the cache store, a round robin organization RRO circuit is needed. Further, according to the present invention, a full/empty flag indicator is required to indicate the valid data information of each of the four levels.

To actually clear the data information from the cache store 10 would entail an elaborate logic circuitry. In addition, the time required to step through each of the locations of either the tag directory or the cache store would consume more time than is available to keep the operation of the cache store effectively hidden from the processor operations. The processor would have to be disabled for a period of time required to completely clear either the tag directory or the cache store. Thus, according to the present invention, a three bit storage unit, a three bit memory cell chip, is provided for each column of the tag directory, see FIG. 4. This three bit storage unit provides the RRO counter to point to the particular level of the addressed column that the next data information is to be entered and also provides a flag indicator to indicate that all four levels contain valid data information and thus the new data information must be written over previously valid data information. This replacement of valid information by new valid information is effectively a presumption that the data that has been longest in the cache store is the least likely to be reused by the processor. Since information is replaced on a four location block basis, anticipation of future information generally occurs.

Figure 4:
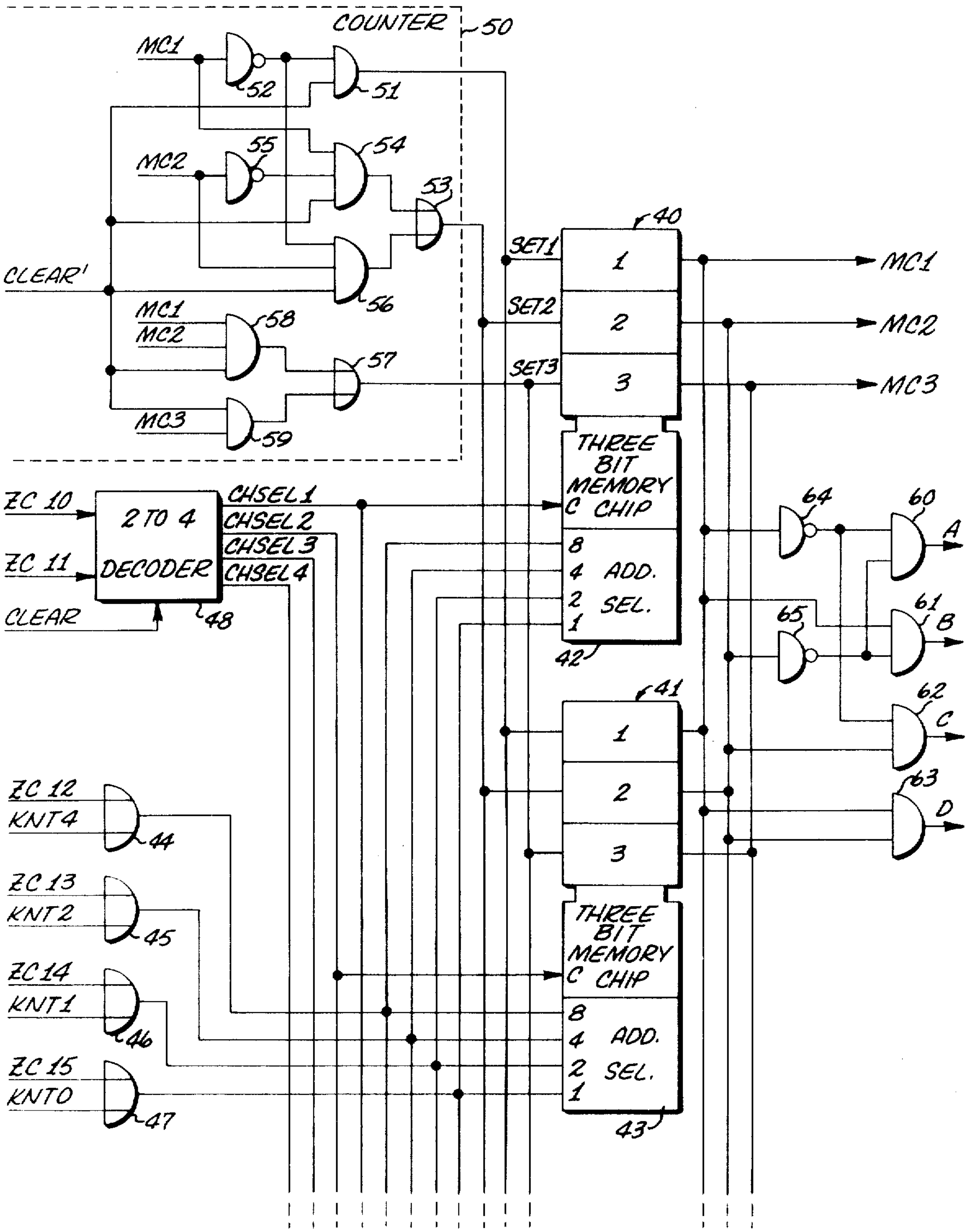
FIG. 4 is a logic diagram of the indicator apparatus control logic for the tag directory as shown in FIG. 1.

By using a three bit storage unit, it is no longer a requirement to provide a two bit counter for each tag directory column, 64 in the present embodiment, along with a full/empty indicator for each of the tag directory locations. The tag directory of the present embodiment would require 256 full/empty indicators, one for each of the four levels in each of the 64 columns. Since the three bit storage unit includes stored information which can be encoded to point to each level of an addressed column and also includes a flag indicator for a particular column, to effectively clear the cache store the only requirement is that the three bit storage unit for each of the 64 columns be cleared. Further, in using the memory cell integrated circuit chips, several can be enabled by a particular chip select signal to effectively clear a group of storage cells at one time. Thus, a portion of the effective address signal can be used to address a group of memory chips, in the present embodiment four at a time, and the rest of the effective address signals can address the remaining group, 16 in the present embodiment. Thus, 16 counts are required to effectively clear the entire cache store. The control logic of the present embodiment for providing a round robin counter and a full/empty indicator is shown in FIG. 4. A circuit usable for clearing the cache store by clearing the three bit memory chips is shown in FIG. 6. A logic circuit for providing the two address signals CA and CB from the RRO circuitry on a write cache store operation and from the comparator circuits No. 1–4, the CC1–4 signals (see FIG. 3), for a read cache store operation is shown in FIG. 7.

Referring now to FIG. 4, the RRO logic and the full/empty mechanism is shown. The RRO logic and the full/empty mechanism comprise a portion of the control logic 31 shown in FIG. 1 and control the placing and locating the data information in the columns of the tag directory and thus into a specified location in the cache store. Two three bit storage units 40 and 41 are shown in FIG. 4 comprising a portion of the 64 units included in the present embodiment. One three bit storage unit is required for each of the columns of the tag directory 28. Since the tag directory 28 of the present embodiment comprises 64 columns, 64 three bit storage units are required.

Three bit integrated circuit memory cell chips are shown in FIG. 4 comprising the three bit storage units 40 and 41. The three bit memory chips 40 and 41 include an address selection portion 42 and 43 driven by a group of four address selection OR-gates 44–47. A portion of the effective address signals ZC12–15 is applied to one leg of each of the four OR-gates 44–47. The other leg of the four OR-gates 44–47 is driven by clear address signals KNTO–4. The clear address signals are generated by the clearing circuit shown on FIG. 6. The operation of the clearing circuit will be explained later.

Continuing with the control logic 31 circuitry of FIG. 4, the address selection OR-gates 44–47 provide 16 possible address signals. The remaining two bits of the effective address signals, bits ZC10 and 11 are applied to a two to four encoder 48 to provide the chip select signals CHSEL1–4. Each chip select signal is directed to four three bit memory chips. Thus, the chip select signals in combination with the effective address signals ZC12–15 individually address all 64 of the three bit memory chips.

The three bits of information stored in all of the memory chips are obtained from a modified increment counter 50. The successive enabling of the stored RRO signals MC1–3 by the modified increment counter 50 is shown in the table of FIG. 5. Each time data information is written into the cache store 10, the three bit memory cell having the same column effective address is incremented according to the table. During a write cache store operation, the CLEAR signal is disabled and thus its inversion signal CLEAR' is high or enabled. A clear cache store operation resets all RRO signals MC1–3 to zero. On the first addressing of the particular three bit memory, memory chip 40 for instance, the RRO signals MC1–3 are read from the addressed memory chip 40 and applied to the modified increment counter 50. The SET1 signal will be enabled by an AND-gate 51 of the increment counter 50. The AND-gate 50 is enabled by the CLEAR' signal and the low MC1 signal applied to an inverter 52 whose output is applied to the AND-gate 51. The SET2 and SET3 signals will be in a low or disabled state. The first bit in the addressed memory chip 40 is enabled. On subsequent addressing of the memory chip 40 the MC1 signal will be high and the SET2 signal will be enabled by an OR-gate 53 and the enabled signals applied to an AND-gate 54. The SET1 and SET3 signals will be low. The second bit is enabled and the pointer is set to point at level C of the tag directory.

On subsequent addressing of the memory chip, the bits are incremented in turn until both the first and second bits are enabled. On the next and all subsequent addressings, the SET3 signal is high via an OR-gate 57 enabled by either an AND-gate 58 having the CLEAR', MC1 and MC2 signals applied thereto, or an AND-gate 59 having the CLEAR' and the MC3 signal applied thereto. The third bit indicates that all four levels of the addressed column are full and that the associated cache store locations contain valid data. Up to the setting of the MC3 signal, only the levels lower than the pointer level can be assumed to contain valid data. Subsequent write operations to the same absolute addresses will update the cache store.

The MC1 and MC2 status signals are the pointer signals which set the level section of the tag directory and through AND-gates 71 and 72 and OR-gates 37 and 38, see FIG. 7, provide the two address signals CA and CB for the cache store 10. The MC1 and MC2 signals are encoded by a group of four AND-gates 60–63 on FIG. 4 to provide the pointer signals A-D which along with the effective address signals ZC10–15 provide the particular level and column location in the tag directory 28. The column location signals point to the column of the tag directory that is to receive the next address of the data information to be stored in the cache store. On a clear or initialized operation, the MC1, MC2 and MC3 signals from all of the three bit memory chips are cleared to all zeros. As data information is placed into the cache store and the address of the data information is placed in the tag directory, the round robin counter is incremented. Thus, with MC1 and MC2 equal to a zero, that is a low signal, see FIG. 5, the column pointer signal A is enabled via AND-gate 60 and inverters 64 and 65 and the stored address signals AL00–09 are placed into level A of the column called out by the effective address signals ZC10–15 (see FIG. 3). At the same time, still referring to FIG. 4, the effective address signals ZC10–15 activate an associated three bit memory chip to set the first bit. On the next cache store write operation addressing the same column of the tag directory, the stored address signals will be placed into level B of the address column.

The indication of valid data in the cache store is accomplished by affecting the generation of the MATCH signal from the comparator 29, see FIG. 3. The CC1 signal from comparator circuit No. 1 is enabled only if either the MC1 or MC2 or MC3 signal is enabled showing that valid address data exists in the A level. The CC2 signal from comparator circuit No. 2 is enabled only if either the MC2 or MC3 signal is enabled showing that valid address data is stored in the A and B levels. The CC3 signal from comparator circuit No. 3 is enabled only if the MC1 and MC2 signals are enabled or the MC3 signal is enabled showing that valid address data is stored in the A, B and C levels. The CC4 signal from comparator circuit No. 4 is enabled only if the MC3 signal is enabled showing that the column is full and all levels contain valid address data. The binary bit storage unit associated with the tag directory column is addressed by the same address signals as the column and therefore the output signals from both are available at the same time.

To clear the cache store 10 the only requirement is to reset all of the three bit memory chips to an all zero position, that is, round robin signals MC1–3 are all low or disabled. All three round robin signals in a low condition designate that no valid data is contained in the particular column by preventing an output from the comparator 29. All three bit store units are cleared to zeros after an initialized signal on a turn-on operation or after a clear operation where all of the data in the cache store effectively becomes nonvalid data information.

Referring to FIG. 6 for the clearing apparatus, on an initialized clear INIT CLEAR signal, a flip-flop 64 is enabled to enable the clear signal CLEAR. The CLEAR signal is directed to a pulse generator 65 and to the two to four encoder 48 on FIG. 4. The output of the pulse generator 65 is directed to the ADD 1 input of a counter circuit 66. The output of the counter circuit 66 are the clear address signals KNTO–4 which are directed to the four address OR-gates 44–47 of FIG. 4. The counter circuit 66 provides an address count from zero through 15 to address the three bit memory cells of FIG. 5 each time the pulse generator 65 emits an enabling signal. Pulse generator 65 emits a continuous stream of pulses while enabled separated in time by a time required to reset a store unit. Upon reaching a count of 16, a CARRY signal is enabled by the counter circuit 66. The CARRY signal is directed to the reset K terminal of the flip-flop 64 to reset the clearing operation and again enable the CLEAR' signal.

Referring again to FIG. 5, the CLEAR signal applied to the two to four encoder 48 enables all of the chip select CHSELI–4 signals. Therefore, as each count from 0 to 15 is enabled by the counter circuit 66 to enable the KNTO–4 signals, four three bit memory chips are cleared at one time. The SET1, 2 and 3 signals are all disabled by the disabled CLEAR' signal applied to the modified increment counter logic gates 51, 54, 56, 58 and 59. Thus after the counter circuit 66 counts 16 counts, the entire cache store 10 is effectively cleared by clearing the round robin and full/empty mechanism thereby making all of the data information in the cache store invalid information.

The clearing of the tag directory and the cache store is performed by merely resetting the storage units. The pointer signal is reset to point to the A level of the tag directory and the round robin MC3 signal is reset to show that whatever data signals contained in the tag directory and the cache store are no longer needed.

Very high speed integrated circuit packages are used for implementation of the cache store 10 as well as the other store units, such as the tag directory 28. The cache store address, see FIG. 2, directs the addressing of the particular circuit package along with the particular word or part of word from each package. The particular addressing of the integrated circuit packages is well known in the art and will not be further explained here. The comparator 29, see FIG. 3, comprises four groups of standard comparing circuits Nos. 1, 2, 3 and 4, with each group of comparing circuits checking a set of 10 address latch register signals AL00–09 with the 10 address signals, M1 for instance, retrieved from the tag directory 28. The second set of 10 address signals M2 are compared in the comparing circuit No. 2. A MATCH signal is generated by the OR-gate 29*a* if all signals of any group are correctly compared. The comparison signals are also directed to a 4 to 2 encoder circuit 29b to generate the CA and CB signals directed to the cache address register 30.

Thus what has been discussed is an embodiment of a communications control system embodying the principles of the present invention. There will be immediately obvious to those skilled in the art many modifications of structure, arrangement, proportions, the elements, materials and components used in the practice of the invention. For instance, a 1K cache store is included in the explanation of the preferred embodiment. It is obvious that by increasing the addressing bit signals by one bit doubles the address capability of the address signals and the usable cache store size to 2K. The size of the cache store 10 should not be taken as a limiting factor. Further it should be obvious that the disclosed status indicating apparatus could be expanded to a four bit storage unit if the levels of the tag directory were expanded to eight. Thus the present invention contemplates $n+1$ bits of information to supply the indicating status for each $2^n$ levels in one column of the tag directory. Also positive logic gates are shown in the present embodiment. It is obvious that it is within the skills of one versed in the art to substitute negative logic without departing from within this invention. The appended claims are, therefore, intended to cover and embrace any such modifications, within the limits only of the true spirit and scope of the invention.

I claim:

1. Status indicator apparatus for an addressed tag directory having a plurality of columns addressed by a portion of an input address data with each column having a plurality of levels each storing another portion of the input address data and showing the placement of data in a cache store, the placement of the next data into the cache store, and the storage of valid data in the cache store, said apparatus comprising:

a binary bit store device for each column of the tag directory addressed by the same address as its associated column, said store device capable of storing $n+1$ bits of information for each $n$th power of 2 number of levels in one column of the tag directory, said bits of information stored in said store device indicating and pointing to valid data in the cache store;

an encoder for each store device to encode the output bit signals from said store device, said encoder providing loading signals having a value determined by said bit signals, said oading signals directing the placement of the data into the next level of the addressed column of the tag directory on a first in/first out basis;

a counter connected to receive binary bits of information from an addressed one of said store devices and to count and store binary bits of information into said addressed store device modified such that the first $n$ bits of information cause said addressed store device to increment the binary count and the last bit of information is stored and held on an overflow count of said first $n$ bits to indicate that the entire column is full and contains valid address data; and means for clearing said store device.

2. A status indication apparatus as described in claim 1 further including:

a plurality of comparators one connected to each level of said tag directory and connected to receive a portion of the input data address for comparing the address data stored in the tag directory retrieved from its associated level of the addressed column of said tag directory to said received portion of the input data address and for generating a signal representative of the state of each tag directory level compare; and a full/empty logic unit connected to receive the output signals from said addressed store device for controlling said plurality of comparators to inhibit the comparison of the data address signals from the addressed tag directory column indicated by the status of the output signals as coming from levels containing invalid address data according to the count of the first $n$ bits of information of said store device with the $n+1$ bit of information of said store device indicating that all levels of its associated tag directory column contain valid data.

3. A status indication apparatus as described in claim 1 wherein the number of levels in each column of said tag directory is equal to four thereby making $n$ equal to 2 and said store device stores three bits of modified count information generated via said counter.

4. An associative memory store comprising:

a cache store including a plurality of random access store devices for storing data;

a tag directory including a plurality of random access store devices arranged in a plurality of columns addressed by a low order portion of addresses with each column having a plurality of levels each storing a high order portion of addresses;

a plurality of comparators one connected to each level of said tag directory to receive the high order portion of addresses from its associated level of an addressed column and to receive the high order portion of the address to generate one of a plurality of match signals if a comparison occurs between any one of the addressed high order address portions from the tag directory level and the high order address portion applied to said comparators;

a first encoder connected to said plurality of comparators to encode the plurality of match signals, said match signals causing said first encoder to develop output signals, the number and polarity of the output signals being determined by the match signals developed by said comparators, said first encoder being coupled to said cache store, said output signals directing the storage of data in said cache store;

a binary bit store device for each column of the tag directory addressed by the same address as its associated column, said store device capable of storing $n+1$ bits of information for each $n$th power of 2 number of levels in one column of the tag directory;

a second encoder for each binary bit store device to encode the output bit signals from said binary bit store device to direct the placement of the data into the next level of the address column of the tag directory according to a round robin organization;

a counter connected to receive binary bits of information from an addressed one of said binary bit store devices and to count and store binary bits of information into said addressed binary bit store device modified such that the first $n$ bits of information of said binary bit store device increment in a binary count and the last bit of information is stored and held on an overflow count of said first $n$ bits to indicate that the entire column is full and contains valid address data; and means for clearing said binary bit store device, said cache store addressed by the low order address portions together on a write operation with the bit information stored in the first $n$ bits of information of said binary bit store devices and on a read operation with the encoded match signals from said first encoder.

5. An associative memory store as described in claim 4 further including:

a full/empty logic unit connected to receive the output signals from said addressed store device for controlling said plurality of comparators to inhibit the comparison of the data address signals from the addressed tag directory column indicated by the output signals as coming from levels containing invalid address data according to the count of the first $n$ bits of information of said store device with the $n+1$ bit of information indicating that all levels of its associated tag directory column contain valid data.

6. A status indication apparatus as described in claim 4 wherein the number of levels in each column of said tag directory is equal to four thereby making $n$ equal to 2 and said store device stores three bits of modified count information generated via said counter.

7. An associative memory store system comprising:

a plurality of random access store devices distributed into a plurality of columns with each column having a plurality of levels for storing a high order portion of an input data address directed to the store system in each level of each column, with each column addressed by a low order portion of the input data address, thereby constituting a tag directory;

a plurality of random access store devices adapted to store data applied to the store system, thereby constituting a cache store;

a plurality of comparators one connected to each level of said tag directory and connected to receive the high order portion of the input data address for comparing a high order portion of the address retrieved from its associated level of the addressed column of said tag directory to said high order input data address portion, and for generating a signal representative of the state of each tag directory level compare;

a store device associated with each column of said tag directory and addressed by the same address, each of said store devices having a capacity of $n+1$ bits, where 2 raised to a power of $n$ is equal to the number of levels in each column;

a counter connected to receive binary bits of information from lan addressed one of said store devices and to count and store binary bits of information into said addressed store device and modified such that the first $n$ bits of information from said addressed store device increment in a binary count and the last bit of information is stored and held on an overflow count of said first $n$ bits to indicate that the entire column is full and contains valid address data; and means for clearing said store device; and full/empty logic connected to said store device for controlling said comparators such that a match comparator condition is inhibited from any or all comparators whenever the output bit information from said store device indicates a count equal to or lower than the position of the level in the tag directory connected to said comparator.

8. A status indication apparatus as described in claim 7 wherein the number of levels in each column of said tag directory is equal to four thereby making $n$ equal to 2 and said store device stores three bits of modified count information generated via said counter.

* * * * *